July 19, 1966  R. L. ROACH  3,261,381
TWO-PART CONTAINER FOR ADHESIVES AND THE LIKE
Filed March 26, 1963  3 Sheets-Sheet 1

INVENTOR.
ROBERT L. ROACH
BY
Hyde W. Ballard

INVENTOR.
ROBERT L. ROACH

July 19, 1966    R. L. ROACH    3,261,381
TWO-PART CONTAINER FOR ADHESIVES AND THE LIKE
Filed March 26, 1963    3 Sheets-Sheet 3

INVENTOR.
ROBERT L. ROACH
BY

United States Patent Office 3,261,381
Patented July 19, 1966

3,261,381
TWO-PART CONTAINER FOR ADHESIVES
AND THE LIKE
Robert Lee Roach, West Chester, Pa., assignor to West Chester Chemical Company, Inc., Borough of West Chester, Pa., a corporation of Pennsylvania
Filed Mar. 26, 1963, Ser. No. 268,202
6 Claims. (Cl. 141—114)

This invention relates to an improved container and method of mixing two part sealants, adhesives, or coatings, and particularly to a combined container and mixing chamber.

The present invention pertains to containers in which adhesives and coatings such as urethanes, epoxies, elastomers or chemicals of this type are stored and shipped. It is customary where the adhesives are of a nature that final mixing cannot take place until a short time before application, to package these materials in separate containers with instructions for proper mixing just prior to use. This is for the reason that after mixing, a reaction takes place and the ability to apply the adhesive after mixing is limited to a relatively short period of time. It is therefore customary for the manufacturer of the product to package each part separately so that the mixing occurs on the job or immediately prior thereto. The mixing is accomplished with a suitable manual stirring implement such as a rod or spatula until the mixture becomes homogeneous and reaction is initiated. Application is then achieved by means of a suitable implement such as a trowel or spatula or a special gun for caulking purposes.

The object of my invention is to provide an improved container for such dual type adhesives whereby the contents of one container can be readily squeezed into the other container which then serves as the mixing chamber.

A further object of the invention is to provide connecting elements which can be attached to two adhesive containers so that the contents of one container can readily be transferred into the other.

A further object of the invention is to supply a sealed two part container for adhesives and the like to which the contents of one container can be transferred to the other without the introduction of any foreign material, and particularly moisture.

A further object of this invention is to provide a suitable mixing chamber for toxic adhesives which eliminates the possibility for contact with the material.

A still further object of the invention is to provide a container and method for mixing two part adhesives suitable for use in abnormal circumstances such as for a lineman on a utility pole or a workman compelled to mix and apply the adhesive in very cramped quarters.

A further object of the invention is to provide a two part adhesive container package in which one of the containers is partly evacuated to a degree sufficient to receive the contents of the other container.

A still further object of the invention is to provide various types of improved couplings for securing the nozzles of two collapsible tubes.

Further objects will be apparent from the specification and drawings in which

Figure 1:
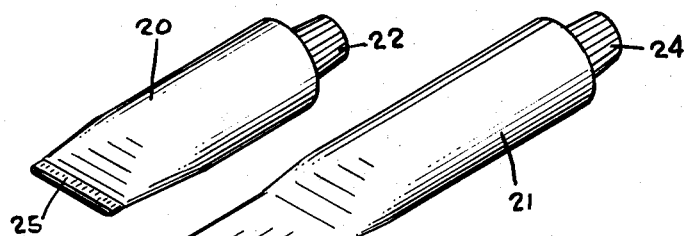
FIG. 1 is a perspective showing a two part adhesive container as filled by the manufacturer.

Referring now more particularly to the drawings I propose to fill a pair of collapsible tubes 20 and 21 with the separate ingredients of a dual type adhesive or coating. Tube 20 is in the preferred form smaller than tube 21 and is completely filled with one of the in ingredients. It is also provided with a tight cap 22. Tube 21 is only partly filled as shown in FIG. 1 and is provided with an elongated flattened rear portion 23 which is completely evacuated of all adhesive ingredients, as well as air. Tube 21 is also provided with a tight cap 24. The opposite ends of tubes 20 and 21 are sealed at 25 and 26 respectively.

It will be understood that the present invention is applicable to any type of container for two different viscous or semi fluid materials. In the preferred form, however, the tubes are constructed of synthetic plastic material such as polyethylene. However, any other form of pliable sheet material can be used, as well as the conventional metal tubes.

Figure 2:
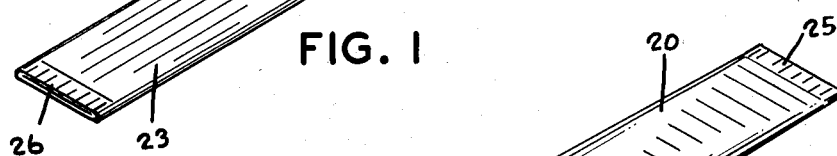
FIG. 2 is a perspective showing the two containers in the form of collapsible tubes connected together by a coupling.
Figure 3:
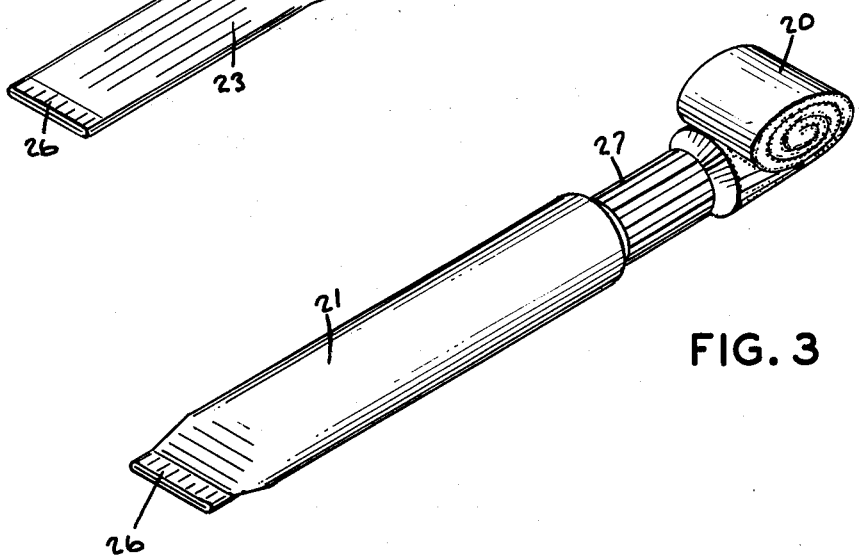
FIG. 3 shows the method of transferring the contents of one container into the other through the coupling.

When it is desired to apply the adhesive, caps 22 and 24 are removed from tubes 20 and 21 whereupon they may be connected together as shown in FIG. 2 by means of a coupling 27 which is secured to the nozzles 28 and 29 of each tube. With coupling 27 securely in place the tube 20 is squeezed manually or otherwise until the contents of tube 20 is injected into the interior of tube 21. This may be done by rolling the tube 20 are shown in FIG. 3 or by any other convenient way of exerting sufficient pressure on the contents of tube 20 to effect the transfer.

Figure 4:
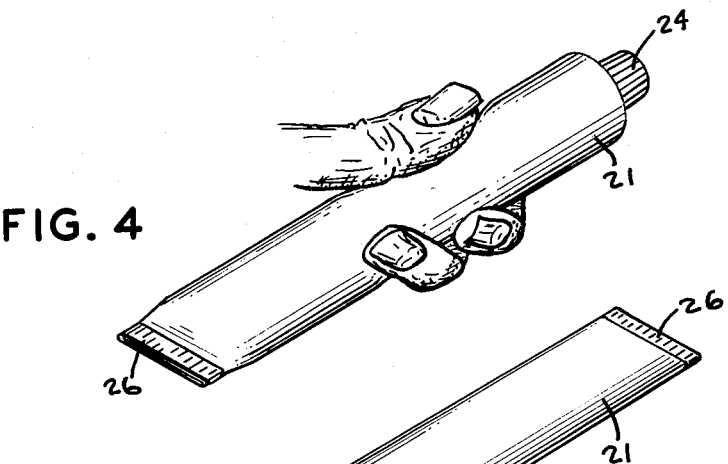
FIG. 4 shows the manner in which the combined contents is thoroughly mixed.
Figure 5:
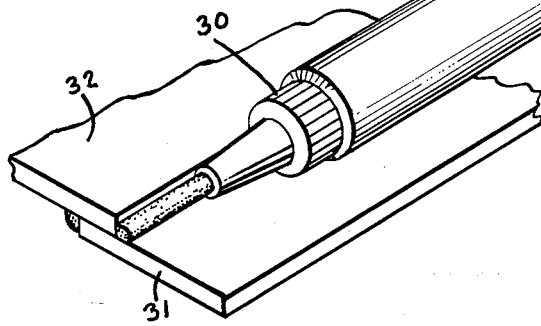
FIG. 5 shows a method of applying the mixed adhesive to a lapped joint.
Figure 6:
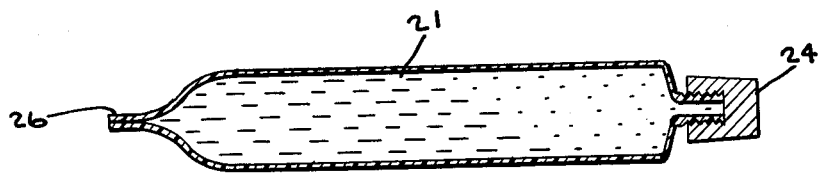
FIG. 6 is a longitudinal section of the mixing tube shown in FIGS. 3 and 4 just after the contents of one tube has been transferred to the mixing tube.
Figure 7:
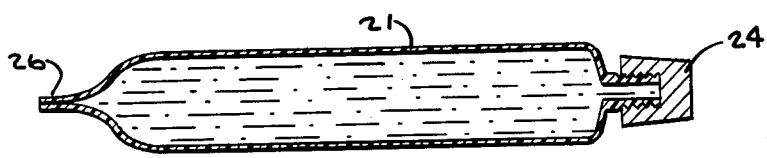
FIG. 7 is a sectional view similar to FIG. 6 after the contents have been completely mixed.

FIG. 6 shows the entire contents of tube 20 transferred into tube 21 and the cap 24 replaced on the nozzle 29 of tube 21 after the coupling 27 has been removed. A vigorous kneading or working action of tube 21 as shown in FIG. 4 is then continued until the two mixtures in tube 21 are thoroughly homogeneous which condition is shown in FIG. 7. The cap 24 may then be removed and an applicator such as spout 30 (FIG. 5) attached to nozzle 29 so that the mixture in tube 21 can be extruded onto a joint between two members 31 and 32 shown in FIG. 5 or onto any other surface to which it is desired to apply the material.

Figure 8:
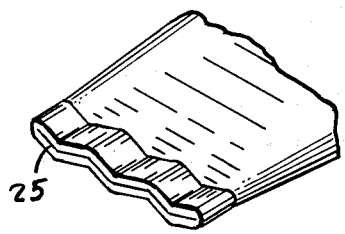
FIG. 8 is a perspective showing the manner in which the end of the tubes is crimped or sealed.
Figure 9:
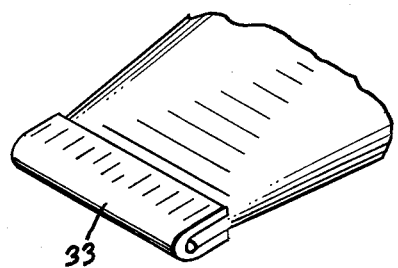
FIG. 9 is a perspective showing another manner for sealing the closed ends of the tubes.

In the case of a thermoplastic tube material the ends 25 and 26 may be crimped and heat sealed as shown in FIG. 8 or alternatively they may compressed and a folded closure 33 applied by means of heat sealing or adhesive as shown in FIG. 9.

Figure 10:
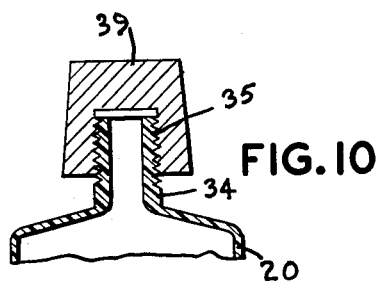
FIG. 10 is a sectional view of a cap for a tube having a male thread.
Figure 11:
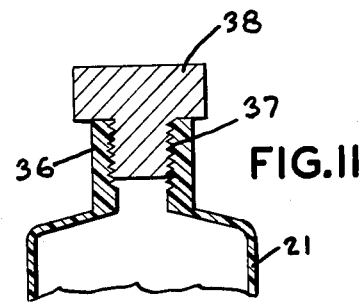
FIG. 11 is a sectional view of a collapsible tube for a female thread.
Figure 12:
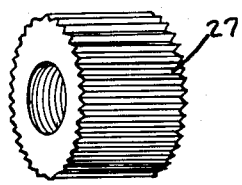
FIG. 12 shows a coupling for connecting two tubes having external threads with nozzles of the same diameter.
Figure 13:
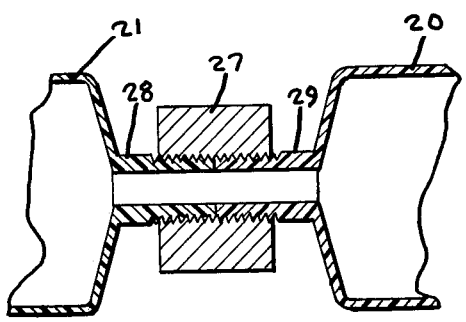
FIG. 13 shows the coupling of FIG. 12 joining the two tubes.
Figure 14:
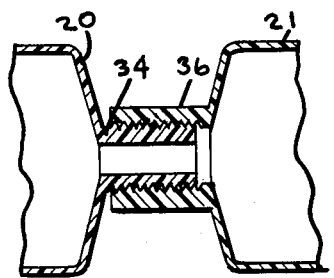
FIG. 14 shows the manner of connecting the tubes in which one tube is provided with an external thread and the other with internal threads.

The coupling 27 is desirably serrated as shown in FIG. 12 for ease of application. In the event that it is not desired to use a separate coupling such as shown in FIG. 13 the tube nozzles may be modified as shown in FIGS. 10 and 11 so that the nozzle 34 of either tube which may, for example, be tube 20, is provided with external threads 35 and the nozzle 36 of the other tube such as tube 21, is provided with internal threads 37 of a diameter sufficient to be turned onto the threads 35 after the male cap 38 is removed from nozzle 36 and the female cap is removed from nozzle 34. The connection between the tubes of FIGS. 10 and 11 is shown in section in FIG. 14.

The invention is applicable to materials in wnich the parts to be mixed are of unequal volume it only being necessary that partially evacuated containers be capable of accepting the required volume from the other containers. In certain circumstances it may be desirable to use a transparent material for the container or tube in order to enable the manipulator to determine when the materials have been sufficiently mixed.

The invention provides an extremely inexpensive and simple package for two part adhesives and the like which must be mixed on location under conditions that are sometimes most adverse to the safe and efficient handling of the materials.

Having thus described my invention, I claim:

1. A two part container assembly for mixing two separate viscous adhesive ingredients with one another which comprises a first collapsible container substantially filled with a first viscous adhesive ingredient, said first container having a discharge opening at one end, a second collapsible container of a size greater than said first container and being partly filled only with a predetermined amount of a second viscous adhesive ingredient with which the first ingredient is to be mixed prior to application, said second container having a discharge opening at one end, said second container having a flattened portion, said flattened portion having expandible walls defining an area equal to at least the interior area of said first container and which will aid in the mixing of the first and second ingredients therein, and means for connecting the two discharge ends of the respective containers in axial alignment with one another whereby the contents of the first container is forced into the second container by collapsing the walls of the first container and thereby expanding the walls of the flattened portion of the second container.

2. A container assembly in accordance with claim 1 in which a nozzle is provided with the discharge opening of each of the containers and said last mentioned means is a coupling for connecting the nozzles to one another.

3. A container assembly in accordance with claim 2 in which the containers are of a synthetic plastic material.

4. A container assembly in accordance with claim 2 in which the contents of the containers forms an epoxy adhesive when mixed and the containers are of polyethylene.

5. Apparatus in accordance with claim 2 in which the coupling comprises an internally threaded collar.

6. Apparatus in accordance with claim 2 in which the coupling comprises external threads on one of the nozzles and internal threads on the other of the nozzles.

References Cited by the Examiner

UNITED STATES PATENTS

| | | | |
|---|---|---|---|
| 1,728,965 | 9/1929 | Hein | 141—311 X |
| 1,876,452 | 9/1932 | Gusdorf | 222—96 |
| 1,890,100 | 12/1932 | Spiro | 141—30 X |
| 2,528,530 | 11/1950 | Machleder | 141—330 X |
| 2,773,521 | 12/1956 | Persson | 141—319 X |
| 2,954,144 | 9/1960 | Elam et al. | 222—386 X |

LAVERNE D. GEIGER, *Primary Examiner.*

E. EARLS, *Assistant Examiner.*